Figure 1:
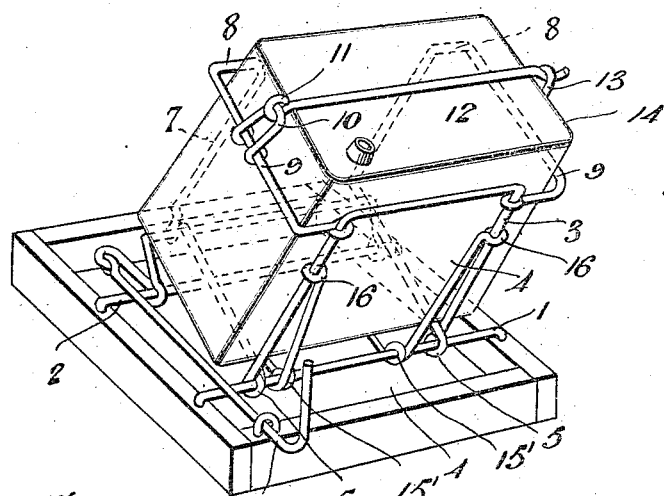

W. MAYFIELD.
RACK.
APPLICATION FILED JULY 5, 1916.

1,235,358.

Patented July 31, 1917.
2 SHEETS—SHEET 1.

Witness
Frederick W. Ely

Inventor
W. Mayfield.
By Victor J. Evans
Attorney

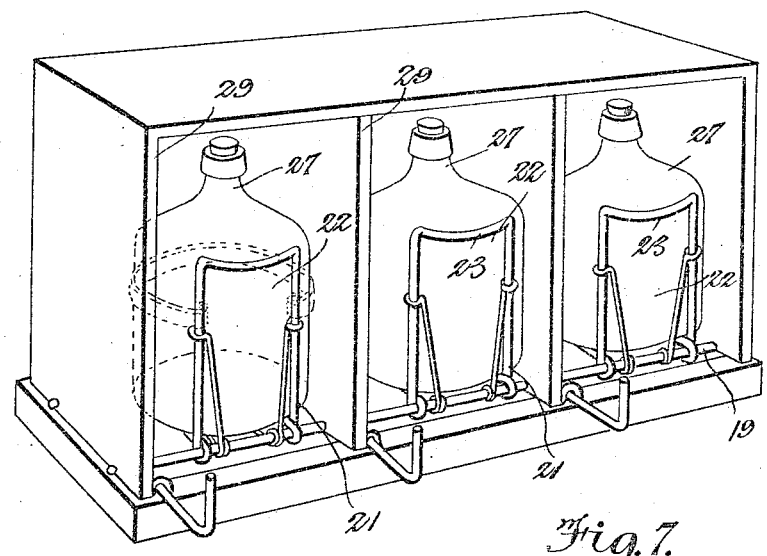
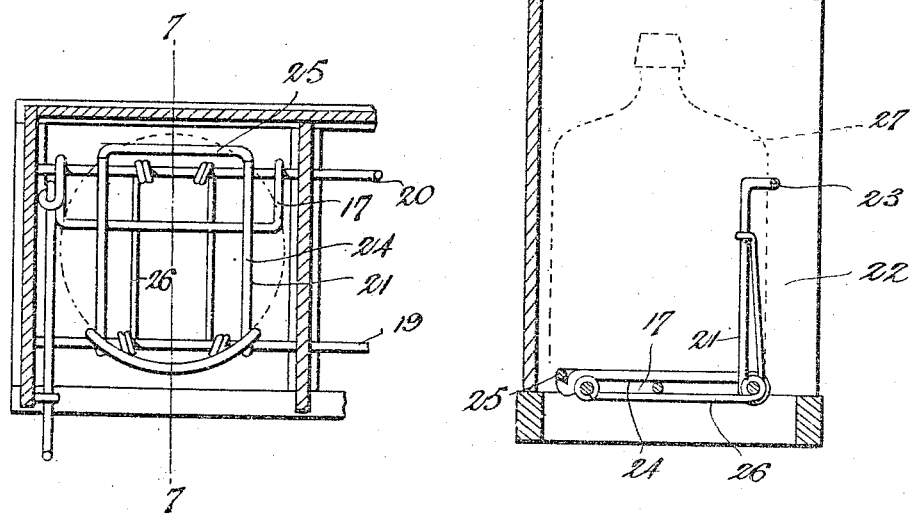

UNITED STATES PATENT OFFICE.

WALKER MAYFIELD, OF SCOTTSVILLE, KENTUCKY.

RACK.

1,235,358.　　　　Specification of Letters Patent.　　Patented July 31, 1917.

Application filed July 5, 1916.　Serial No. 107,613.

*To all whom it may concern:*

Be it known that WALKER MAYFIELD, a citizen of the United States, residing at Scottsville, in the county of Allen and State of Kentucky, has invented new and useful Improvement in Racks, of which the following is a specification.

This invention relates to a device for supporting demijohns, carboys, cans or other vessels containing a liquid which is to be dispensed, and the primary object of the invention is to provide means whereby a great number of such vessels may be sustained in a comparatively small space and whereby the said vessels may be easily and quickly tilted when the contents or portions of the contents are to be poured therefrom.

Another object of the invention is to produce a device of this class which may be in the nature of a cabinet, and which shall embody the desirable features of simplicity in construction, cheapness to manufacture and thorough ease and efficiency in operation.

With the above and other objects in view the improvement resides in the construction, combination and arrangement of parts set forth in the following specification and falling within the scope of the appended claims.

Figure 2:
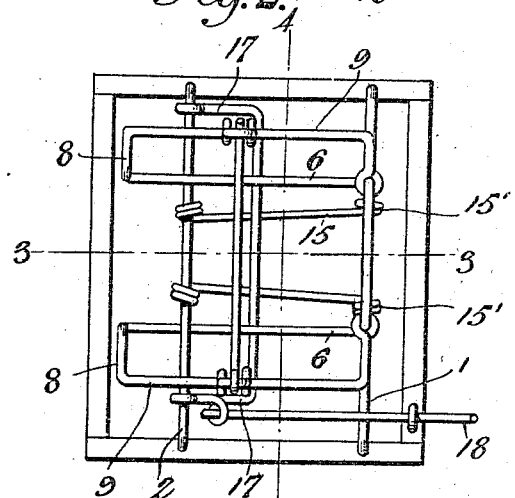
Figure 3:
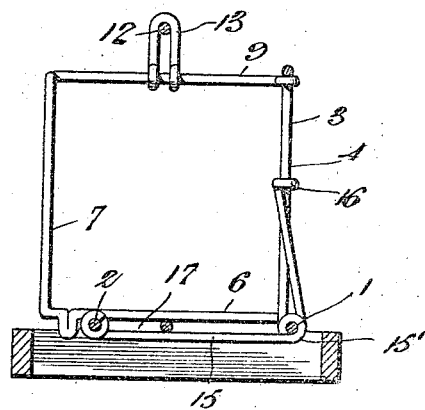
Figure 4:
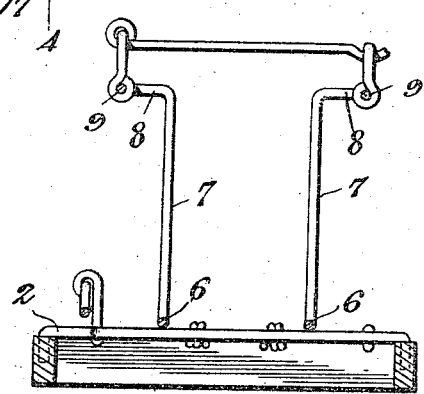

In the drawings:

Figure 1 is a perspective view illustrating a receptacle or container rack constructed in accordance with the present invention, the same being tilted as when the contents are to be drawn therefrom, Fig. 2 is a top plan view of the rack, Fig. 3 is a sectional view approximately on the line 3—3 of Fig. 2, Fig. 4 is a sectional view approximately on the line 4—4 of Fig. 2, Fig. 5 is a perspective view illustrating a modified form of the rack and showing a plurality of receptacle containing or supporting members thereon, Fig. 6 is a central longitudinal sectional view through one of the receptacle supporting members or holders, and Fig. 7 is a sectional view approximately on the line 7—7 of Fig. 6.

Each of the racks may be arranged in a separate cabinet if desired or one cabinet may contain a plurality of racks and the holder members for the containers, carboys or receptacles from which liquid is to be dispensed. The rack in each instance, however, preferably includes a pair of spaced longitudinally extending rods 1 and 2 respectively, and the holder members while not necessarily, are preferably, each constructed from a single rod. These holder members comprise an open front portion 4 which, as shown, includes vertically straight members and a horizontally disposed connecting member. The vertical members are each bent upon itself to provide the same with a rounded eye portion 5, and these eyes receive the rod 1. The coils from the eyes are extended rearwardly in parallelism resting upon the rear rod 2 and these parallel rods, distinguished by the characters 6, provide what may be termed the bottom of the holder. The ends of the rods 6 are bent upwardly, as at 7, and are from thence extended outwardly, as at 8, and then continued inwardly and longitudinally toward the front, as indicated by the numerals 9, and these members 9 which form the sides of the holder have their ends bent inwardly and twisted around or otherwise connected with the vertical or side members of the front 3. One of the side members 9 has arranged thereon an eye member 10 which may be slidable upon the said member 9 if desired, the said eye receiving a bent portion or eye 11 formed in one end of a transversely arranged rod or strap 12. The opposite end of this strap 12 may be bent to provide a hook which is adapted to be received in an eye member 13 arranged upon the second side member 9, and the strap is adapted to be brought over the carboy or receptacle 14 to retain the same in the holder.

Secured to the rear rod 2, preferably by being twisted around the same, is a resilient wire member 15 which has its arms extending angularly toward and twisted around the front rod 1, as at 15′, and its ends extended upwardly and formed with hook members 16 which engage with the vertical members of the front 4 of the holder 3. This member 15 being, as stated, of resilient material, provides the spring for the holder and is adapted to swing the same to bring the bottom thereof into contact with the rear rod 2 or to hold the holder in a horizontal position.

Hingedly secured upon the rear rod 2 is a crank 17, which is of a length sufficient to lie beneath both of the rods 6, which as stated provide the bottom for the holder, and also to rest upon the angularly disposed strands or arms 15 of the resilient member 15. The numeral 18 designates an operating lever which is loosely connected with the crank 17 and projects outwardly of the frame within which the rods 1 and 2 are arranged and by operating this lever 18, the crank may be swung into contact with the lower surface of the holder to tilt the rear end of the said holder so that the contents from the receptacle may readily flow through the mouth thereof.

The above construction refers to the device shown in Figs. 1 to 4 of the drawings and in the remaining figures I have illustrated a slightly modified construction. In these figures two spaced longitudinally extending rods 19 and 20 are secured upon any desired horizontally disposed support and pivotally secured to the outer rod 19 is a plurality of holder members 21. These holder members may be, as shown, each constructed from a single element, such as a rod, wire or the like, and each of said holders comprises an open front 22 comprising spaced vertically extending members having an outwardly curved connecting member 23, and the ends of the front members are wound upon themselves and around the front rod 19 and are from thence continued rearwardly over the rear rod 20, providing the bottom 24 of the holder. The side rods of the bottom are connected by a rear rod 25. The numeral 26 designates a spring member which is connected to the rear rod 20 projects centrally between the arms providing the bottom of the holder and these members are wound or twisted around the front rod 19 and are from thence extended outwardly and have their ends hooked to engage with the rods comprising the front of the holder. The members just referred to provide the holder with a spring whereby the bottom thereof is normally forced to a horizontal position and also serve as an additional support for the front portion of the receptacle or container 27 which is received in the holder. The container in this instance comprises a member which is round in cross section and which has its front portion engaged by the rounded element of the front of the holder proper. If desired a crank may be hingedly connected with the rear rod 20 and may be provided with an operating lever, the said construction being substantially similar to that previously described, but also these elements may be dispensed with as the containers arranged in these holders are disposed vertically thereof so that the same may be readily tilted by a gentle pressure upon the upper and outer edge of the container. Also if desired suitable means may be provided for limiting the angle to which the holders are swung. The holder members are retained in spaced relation with each other by vertically disposed rods or plates 29 as clearly shown in the drawings, and whereby each of the holders is retained in what may be termed a separate compartment. As indicated by the dotted lines, a strap or similar device may be secured to the holder to engage with the vessel supported upon the holder, and so removably secure the said vessel to the holder. It is, of course, to be understood that the elements comprising the holder may be shaped to conform with the outer contour of the dispensing apparatus with which they are engaged.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. In a device for the purpose set forth, supporting rods, a holder having an open front hingedly connected with the outer rod, means upon the inner rod and engaging with the holder for swinging the holder, means for actuating the swinging means, spring means for normally retaining the holder upon the supporting rods.

2. In a device for the purpose set forth, a cabinet having an inner and an outer longitudinally disposed parallel rod, a holder hingedly secured to the outer rod and resting upon both of the rods, and spring means secured to the rods and engaging with the outer portion of the holder for normally retaining the holder seated upon the rods.

3. In a device for the purpose set forth, a support, a holder member pivotally secured to the support at one of the ends of the said holder member, and spring means for normally retaining the holder upon the support.

4. In a device for the purpose set forth, a support, a substantially rectangular frame comprising a holder member pivotally secured to the support at the lower and outer corner thereof, and means for tilting the holder upon the support.

5. In a device for the purpose set forth, a support, a battery of holder members having their outer and lower corners hingedly secured to the support, members separating each of the holder members, spring means for normally retaining the holder members upon the support, an adjustable element upon each of the holders for sustaining an article thereon, and means for tilting the holder upon the support.

6. In a device for the purpose set forth, two horizontally disposed parallel rods, a holder formed from a single element comprising an open front bent at its lower corners to provide eyes which receive the outer rod member and having rearwardly extending members which rest upon the inner rod member, a crank pivoted to the inner rod member and underlying the said rearwardly extending members of the holder, and an operating lever for the crank.

7. In a device for the purpose set forth, two horizontally disposed parallel rods, a holder member comprising a frame having its lower and outer corners formed with eyes which receive the outer rod and its lower portion resting upon the inner rod, a resilient member connected to the inner rod and having angular arms coiled around the outer rod which terminate in spring arms provided with hooks which engage with the outer surface of the holder member to swing the said holder member in the direction of the rods, means pivotally secured to the inner rod and underlying the holder for engaging with the holder to swing the same to an incline with respect to the rods, and means for operating such swinging means.

In testimony whereof I affix my signature in presence of two witnesses.

WALKER MAYFIELD.

Witnesses:
JOSEPH KITT,
A. S. LONG.

Copies of this patent may be obtained for five cents each, by addressing the "Commissioner of Patents, Washington, D. C."